(12) United States Patent
Verbist et al.

(10) Patent No.: US 8,815,005 B2
(45) Date of Patent: Aug. 26, 2014

(54) SULPHUR CEMENT PRODUCT

(75) Inventors: Guy Iode Magda Maria Verbist, Amsterdam (NL); Ingrid Ploegaert, Amsterdam (NL); Egbert Veldman, London (GB)

(73) Assignee: Shell Oil Company, Houston, TX (US)

( * ) Notice: Subject to any disclaimer, the term of this patent is extended or adjusted under 35 U.S.C. 154(b) by 515 days.

(21) Appl. No.: 13/321,266

(22) PCT Filed: May 18, 2010

(86) PCT No.: PCT/EP2010/056795
§ 371 (c)(1),
(2), (4) Date: Jan. 4, 2012

(87) PCT Pub. No.: WO2010/133581
PCT Pub. Date: Nov. 25, 2010

(65) Prior Publication Data
US 2012/0118206 A1 May 17, 2012

(30) Foreign Application Priority Data
May 20, 2009 (EP) .................................... 09160794

(51) Int. Cl.
| | | |
|---|---|---|
| *C04B 28/36* | (2006.01) | |
| *C04B 24/00* | (2006.01) | |
| *C08L 95/00* | (2006.01) | |
| *C04B 103/60* | (2006.01) | |
| *C04B 111/00* | (2006.01) | |
| *C04B 111/25* | (2006.01) | |

(52) U.S. Cl.
CPC ............ *C04B 28/36* (2013.01); *C04B 2103/60* (2013.01); *C04B 2111/00482* (2013.01); *C04B 2111/25* (2013.01); *C08L 95/00* (2013.01)
USPC ....... 106/272; 428/446; 428/454; 106/287.32

(58) Field of Classification Search
CPC C04B 2111/25; C04B 2103/60; C04B 28/36; C04B 21/00; C04B 14/06; C04B 40/0085
USPC .................................. 106/272; 428/446, 454
See application file for complete search history.

(56) References Cited

U.S. PATENT DOCUMENTS

| | | | |
|---|---|---|---|
| 4,188,230 A | * | 2/1980 | Gillott et al. .................. 501/140 |
| 5,486,542 A | | 1/1996 | Posthuma et al. ............ 518/700 |
| 2011/0186774 A1 | * | 8/2011 | Lankshear et al. ....... 252/182.17 |

FOREIGN PATENT DOCUMENTS

| | | | | |
|---|---|---|---|---|
| EP | 0668342 | | 8/1995 | ............ C10G 65/04 |
| EP | 2447232 | * | 5/2012 | |
| FR | 966683 | | 10/1950 | |
| FR | 1227715 | | 8/1960 | |
| GB | 221857 | | 6/1923 | |
| JP | 2001048618 | | 2/2001 | ............ A01K 61/00 |
| RU | 2152368 | | 7/2000 | ............ C04B 14/22 |
| RU | 2237300 | | 9/2004 | ............ C04B 28/36 |
| RU | 2248634 | * | 3/2005 | |
| WO | WO9934917 | | 7/1999 | ............ B01J 23/75 |
| WO | WO02102941 | | 12/2002 | ............ C10G 73/44 |
| WO | WO2007065920 | | 6/2007 | ............ C01B 17/04 |
| WO | WO2008148804 | | 12/2008 | ............ C04B 24/02 |
| WO | WO2008152054 | | 12/2008 | ............ C04B 24/40 |

OTHER PUBLICATIONS

Tum, Peter; "The Markets for Shell Middle Distillate Synthesis Products"; International Gas Ltd., Alternative Energy '95; Vancouver, Canada, May 2-4, 1995.

* cited by examiner

*Primary Examiner* — David M Brunsman
(74) *Attorney, Agent, or Firm* — Charles W. Stewart

(57) ABSTRACT

A sulphur cement product comprising from 10 to 30 wt % sulphur, 70 to 90 wt % of particulate inorganic material and from 0.4 to 2 wt % wax, and comprising less than 5 wt % bitumen, wherein the weight percentages are based upon the weight of the sulphur cement product, is disclosed. Further disclosed is a process for preparing a sulphur cement product; a process for preparing a sulphur cement surfacing on a structural material; and use of a wax to improve the fouling deposit removal and/or graffiti removal properties of a sulphur cement product.

18 Claims, No Drawings

SULPHUR CEMENT PRODUCT

PRIORITY CLAIM

This application is a 371 filing of PCT/EP2010/056795, filed 18 May 2010, which claims priority from European Application 09160794.5, filed 20 May 2009.

FIELD OF THE INVENTION

The present invention provides a sulphur cement product; a process for preparing a sulphur cement product; and use of a sulphur cement product.

BACKGROUND OF THE INVENTION

Sulphur cement generally refers to a product comprising at least sulphur and a filler. To improve the properties of the sulphur cement, the sulphur may be modified using a sulphur modifier, e.g. naphthalene or olefinic compounds such as 5 ethylidene-2-norbornene (ENB) or 5 vinyl-2-norbornene (VNB), dicyclopentadiene, limonene or styrene. Typical sulphur cement fillers are particulate inorganic materials.

Sulphur cement-aggregate composites generally refer to a composite comprising both sulphur cement and aggregate. Examples of sulphur cement-aggregate composites are sulphur mortar and sulphur concrete.

Sulphur cement-aggregate composites may be used to provide a wide variety of structural products such as marine defence units, sea walls and coastal pathways, paving slabs and kerbs, road barriers and bollards, retaining walls and garden furniture. These structural products, particularly in urban environments, may be defaced by graffiti, and/or may be subject to fouling and it would be advantageous to provide a structural product wherein the graffiti damage and/or fouling deposits can be reduced or removed. Examples of fouling deposits include chewing gum; animal excretion; soot from exhaust fumes; algae and other marine deposits.

The present inventors have sought to provide sulphur cement products that can be used in the preparation of structural products wherein graffiti damage and/or fouling deposits can be reduced or removed.

SUMMARY OF THE INVENTION

Accordingly, the present invention provides a sulphur cement product comprising from 10 to 30 wt % sulphur, 70 to 90 wt % of particulate inorganic material and from 0.4 to 2 wt % wax, and comprising less than 5 wt % bitumen, wherein the weight percentages are based upon the weight of the sulphur cement product.

The inventors have found that by incorporating wax into the sulphur cement product, it is possible to provide a structural product wherein graffiti can be reduced or even removed by washing the surface of the sulphur cement product with water. Additionally, the presence of the wax does not detrimentally affect the mechanical properties of the sulphur cement product.

The inventors have further found that by incorporating wax into the sulphur cement product, it is possible to provide a structural product wherein fouling can be reduced or even removed by washing the surface of the sulphur cement product with water.

According to another aspect, the present invention relates to a process for preparing a sulphur cement product as described herein, comprising steps of mixing the sulphur, particulate inorganic material and wax, and, if present, bitumen, at a temperature at which sulphur is molten, and cooling to a temperature at which the sulphur solidifies.

According to another aspect, the present invention relates to a process for preparing a sulphur cement surfacing on a structural material, wherein a sulphur cement product as described herein is applied to the surface of a structural material.

According to another aspect, the present invention relates to use of a wax to improve the fouling deposit removal properties and/or graffiti removal properties of a sulphur cement product, in particular of a structural product prepared from a sulphur cement product.

FR 966.683 describes a process for preparing construction elements. The process involves mixing 65% sand; 21% sulphur; 13% bitumen; 0.5% calcium carbonate; 0.5% graphite and 0.05% of wax. The document is silent on graffiti removal properties and/or anti-fouling properties.

FR 1.227.715 describes a plastic material containing sulphur. Sulphur may be able to replace a thermoplastic binder in part or in full. Specifically, an insulating material for a railway line is disclosed consisting of 50% sulphur; 25% asbestos; 20% talc and 5% wax.

RU 2237300 C2 describes a binder for manufacturing radiation-shielding building materials. The binder contains 44.2-46.6% sulphur, 52.0-54.25% filler and 0.25-0.3% paraffin and may in addition comprise carbon fibers of 10-15 mm in length.

RU 2152368 C2 describes a composition for manufacture of building products for protection from ionisation radiation which composition contains 7.55-9.5% sulphur; 0.45-0.5 paraffin; optical glass production waste 14-17 wt %; and lead shot aggregate with particle diameter 3-4 mm the balance.

DETAILED DESCRIPTION OF THE INVENTION

Reference herein to a sulphur cement product is to a sulphur cement or a sulphur cement-aggregate composite. A sulphur cement refers to a composition comprising sulphur or modified sulphur and a filler. Sulphur cement fillers are particulate inorganic materials with an average particle size of less than 0.1 mm. Sulphur cement-aggregate composites refer to a composite comprising both sulphur cement and a particulate inorganic material aggregate. Examples of sulphur cement-aggregate composites are sulphur mortar and sulphur concrete. Mortar comprises fine aggregate, typically with particles having an average diameter between 0.1 and 5 mm, for example sand, and does not comprise coarse aggregate. Concrete comprises coarse aggregate, typically with particles having an average diameter greater than 5 mm, preferably having an average diameter between 5 and 40 mm, and optionally comprises fine aggregate.

The sulphur cement product preferably comprises less than 2 wt % bitumen, and more preferably comprises no bitumen (in other words, the sulphur cement product is preferably not sulphur enhanced asphalt). The sulphur, particulate inorganic material and wax preferably comprise at least 90 wt % of the sulphur cement product, more preferably at least 95 wt % of the sulphur cement product.

The sulphur in the sulphur cement product is preferably supplied as elemental sulphur or modified sulphur (wherein elemental sulphur has been modified by inclusion of sulphur modifier, e.g. naphthalene or olefinic compounds such as 5 ethylidene-2-norbornene (ENB) or 5 vinyl-2-norbornene (VNB), dicyclopentadiene, limonene or styrene, incorporated in an amount from 0.1 to 10 wt % based on the weight of sulphur).

The sulphur cement product comprises from 10 to 30 wt % sulphur, preferably from 10 to 25 wt % sulphur, most preferably from 15 to 25 wt % sulphur.

The particulate inorganic material in the sulphur cement product can be chosen from a wide range of materials. Examples of suitable particulate inorganic materials are silica, fly ash, limestone, quartz, iron oxide, alumina, titania, carbon black, gypsum, talc or mica, sand, gravel, rock or metal-silicates. Such metal silicates are for example formed upon heating heavy metal containing sludge in order to immobilise the metals. More preferably the particulate inorganic material is a silica or a silicate. Examples of such silica or silicates are quartz, sand and metal-silicates (e.g. mica).

The particulate inorganic material may consist essentially of a filler material (with an average particle size of less than 0.1 mm) such that the sulphur cement product is a sulphur cement. The particulate inorganic material may comprise both filler and fine aggregate (with particles having an average diameter between 0.1 and 5 mm) such that the sulphur cement product is a sulphur mortar. The particulate inorganic material may comprise filler, coarse aggregate (with particles having an average diameter greater than 5 mm) and optionally fine aggregate (with particles having an average diameter between 0.1 and 5 mm) such that the sulphur cement product is a sulphur concrete.

The sulphur cement product comprises from 70 to 90 wt % particulate inorganic material, more preferably from 75 to 90 wt % particulate inorganic material and most preferably from 75 to 85 wt % particulate inorganic material. The two major components in the sulphur cement product are sulphur and particulate inorganic material and the amounts of sulphur and particulate inorganic material are chosen to ensure sufficient binding (from the sulphur) and sufficient strength (from the particulate inorganic material).

The wax is preferably a paraffin wax, most preferably a paraffin wax resulting from a Fischer-Tropsch process. Fischer-Tropsch waxes are known to those skilled in the art. A detailed account of Fischer-Tropsch waxes was published as "Fischer-Tropsch Waxes", ISBN 0620075600, on 13 Mar. 1984, ed. J H Le Roux and S Oranje; published by Sasol One (PTY) Ltd and SasolChem (PTY Ltd), Republic of South Africa. Fischer-Tropsch waxes are available commercially from Sasol and Shell MDS (Malaysia) Shd Bhd. The latter products have for example been described in "The Markets for Shell Middle Distillate Synthesis Products", presentation by Peter Tijm, Shell International Gas Ltd., Alternative Energy '95, Vancouver, Canada, May 2-4, 1995.

Typically, the Fischer-Tropsch waxes have been hydrogenated and/or hydrofinished to remove or substantially reduce any olefins or oxygenates formed in the Fischer-Tropsch reaction. A preferred Fischer-Tropsch synthesis process is disclosed in WO-A-9934917. The synthesis product as directly obtained in the Fischer-Tropsch process is preferably hydrogenated in order to remove any oxygenates and saturate any olefinic compounds present in such a product. Such a hydrotreatment is described in for example EP-B-0668342. A preferred process for preparing Fischer-Tropsch waxes is disclosed in U.S. Pat. No. 5,486,542.

Preferably, the paraffin wax comprises at least 80% mol, more preferably at least 85% mol., even more preferably at least 90 mol % of straight chain alkanes, as determined using a $^{13}C$ NMR analytical technique described in detail in WO02/102941. Preferably the alkane chain length is in the range from about C30 to about C100 or even higher. Preferably, the congealing point (ASTM D938) of the wax is from 60 to 130° C., more preferably from 70 to 120° C., even more preferably 70 to 110° C. Preferably, the wax has an oil content (ASTM D721) of less than 5% wt, more preferably less than 2% wt, even more preferably less than 1% wt. The wax may also be a refined slack wax. Slack wax is a crude wax produced by chilling and solvent filter-pressing wax distillate in refinery operations. A refined slack wax is a slack wax that has been subjected to a hydrotreating operation prior to or after separation from the wax containing distillate.

The amount of wax in the sulphur cement product is from 0.4 to 2 wt %, preferably from 0.4 to 1.5 wt %, more preferably from 0.4 to 1 wt %, even more preferably from 0.5 to 1 wt %, based upon the weight of the sulphur cement product. Increasing the amount of wax improves the anti-graffiti properties of the sulphur cement product. However, the amount of wax in the sulphur cement product is limited by how much wax can actually be dissolved in the sulphur cement product. Additionally, the inventors have observed that increased levels of wax can reduce the strength of the sulphur cement product and this may be undesirable for some applications.

The sulphur cement product may also comprise a coupling agent that improves the interaction between the sulphur and the particulate inorganic material. Known coupling agents include organosilanes and organotitanates e.g. as described in WO 2007 065920, WO 2008 148804 and WO 2008 152054. The amount of coupling agent is preferably from 0.1 to 1.5 wt % based upon the weight of the sulphur.

The sulphur cement product may be prepared by mixing the sulphur, particulate inorganic material and wax at a temperature at which sulphur is molten, i.e. typically above 120° C., preferably in the range of from 120 to 150° C., more preferably in the range of from 125 to 140° C. The duration of mixing should be sufficient to achieve dispersion of the wax throughout the sulphur cement product. The molten sulphur cement product may be solidified by cooling the product to a temperature at which the sulphur solidifies.

Preferably the wax that is mixed with the sulphur and the particulate inorganic material is in a solid form such as pellets. In one embodiment of the invention, the wax pellets further comprise a coupling agent such as an organosilane that can improve the water intrusion properties of the structural products made from the sulphur cement products.

The sulphur cement product produced by the process of the present invention is suitable for use in typical sulphur cement product applications. A sulphur cement produced by the process can be combined with aggregate to provide a sulphur-cement aggregate composite. Sulphur concrete produced by the process of the present invention can be moulded to provide products such as paving materials and sea defences. Sulphur cement can be used to provide surfacing on other structural materials, e.g. on the surface of Portland cement, as an anti-graffiti protective layer and/or anti-fouling protective layer.

EXAMPLES

The invention is further illustrated by means of the following non-limiting examples.

Preparation of Sulphur Cement Samples

Sulphur was preheated at 65° C.; sand and filler were preheated at 150° C. The sulphur was melted in an oil-jacketed pan at 130-140° C. and sand was added whilst stirring. The coupling agent (an organosilane) was added, followed by filler and finally the wax. The components were stirred such that a homogeneous well-mixed composition was obtained.

Four different waxes were used; all were paraffin waxes produced via a Fischer-Tropsch process. Wax 1 and wax 2 were composed primarily of unbranched alkanes. Wax 3 was SX 70, typically having a congealing point (ASTM D938) of 70-72° C. and an oil content (ASTM D721) of <0.1 wt %, available commercially from Shell, and wax 4 was SX 100, typically having a congealing point (ASTM D938) of 96-98° C. and an oil content (ASTM D721) of <0.1 wt %, available commercially from Shell. Wax 3 and wax 4 are composed of both unbranched and branched alkanes, but primarily of unbranched alkanes. Typically, the unbranched alkane content is more than 85% mol, in particular about 90% mol, as determined using $^{13}$C NMR, described in WO02/102941.

The formulations are summarised in Table 1. The amounts of wax are given as weight percentages based upon the weight of the sulphur cement.

TABLE 1

|  | Type of Wax | Amount of Wax (wt %) |
| --- | --- | --- |
| Comparative Example 1 | None | 0 |
| Example 1 | Wax 1 | 0.5 |
| Comparative Example 2 | Wax 2 | 0.05 |
| Comparative Example 3 | Wax 2 | 0.25 |
| Example 2 | Wax 2 | 0.5 |
| Example 3 | Wax 3 | 0.5 |
| Example 4 | Wax 4 | 0.5 |

The ease of dissolution of the wax in the sulphur cement mixture and the viscosity of the resulting mixture were assessed visually and are recorded in Table 2 below.

To prepare cast samples, moulds were preheated at 150° C., and the formulations were cast into the moulds. The mould was left to cool in air for at least 1-2 hrs. Then the sample was removed from the mould.

Graffiti Removal

Spray paint was sprayed onto the samples and allowed to dry. Attempts were made to remove the paint by washing with a wet cloth and soap powder. The amount of paint removal was assessed visually and the results are given in Table 2:

TABLE 2

|  | Ease of dissolution of wax | Viscosity of mixture | Removal of graffiti |
| --- | --- | --- | --- |
| Comparative Example 1 | N/A | Excellent | Poor |
| Example 1 | Good | Poor | Good |
| Comparative Example 2 | Good | Very good | Poor |
| Comparative Example 3 | Good | Very good | Poor |
| Example 2 | Good | Very good | Very good |
| Example 3 | Less good | Less good | Less good |
| Example 4 | Very good | Good | Good |

Increasing the amount of wax 2 (compare comparative examples 2, 3 and example 2) from 0.05% to 0.5% improves the removal of graffiti.

Strength of Formulations

The inventors wished to test if incorporating wax into sulphur cement samples detrimentally affected the flexural strength of the formulations. Sulphur cement samples were prepared as described above, with varying amounts of wax. The flexural strength was tested and the results are given in table 3:

TABLE 3

| Wax | Wax weight % | Flexural Strength (MPa) |
| --- | --- | --- |
| None | 0 | 11.3 |
| Wax 1 | 1 wt % | 7.1 |
| Wax 1 | 2 wt % | 5.7 |

TABLE 3-continued

| Wax | Wax weight % | Flexural Strength (MPa) |
| --- | --- | --- |
| Wax 2 | 0.12 wt % | 10.1 |
| Wax 2 | 0.5 wt % | 8.2 |
| Wax 2 | 1 wt % | 8.6 |
| Wax 2 | 2 wt % | 6.1 |

Increasing the amount of wax reduces the flexural strength of the sample, so the amount of wax incorporated into the formulation should be a balance between the graffiti removal requirements and the strength requirements of the sulphur cement product.

What is claimed is:

1. A sulphur cement product comprising from 10 to 30 wt % sulphur, from 70 to 90 wt % of particulate inorganic material, from 0.4 to 2 wt % wax, and less than 5 wt % bitumen, wherein the weight percentages are based upon the weight of the sulphur cement product.

2. A sulphur cement product according to claim 1, comprising less than 2 wt % bitumen.

3. A process for preparing a sulphur cement product according to claim 2, comprising steps of mixing the sulphur, particulate inorganic material and wax at a temperature at which sulphur is molten, and cooling to a temperature at which the sulphur solidifies.

4. A sulphur cement according to claim 2, wherein the wax is a paraffin wax resulting from a Fischer-Tropsch process.

5. A process for preparing a sulphur cement product according to claim 4, comprising steps of mixing the sulphur, particulate inorganic material and wax at a temperature at which sulphur is molten, and cooling to a temperature at which the sulphur solidifies.

6. A sulphur cement according to claim 2, wherein the sulphur is elemental sulphur that has been modified by inclusion of sulphur modifier chosen from one or more of naphthalene, 5 ethylidene-2-norbornene, 5 vinyl-2-norbornene, dicyclopentadiene, limonene or styrene, wherein the sulphur modifier is incorporated in an amount from 0.1 to 10 wt % based on the weight of sulphur.

7. A sulphur cement according to claim 6, wherein the wax is a paraffin wax resulting from a Fischer-Tropsch process.

8. A process for preparing a sulphur cement product according to claim 7, comprising steps of mixing the sulphur, particulate inorganic material and wax at a temperature at which sulphur is molten, and cooling to a temperature at which the sulphur solidifies.

9. A process for preparing a sulphur cement product according to claim 6, comprising steps of mixing the sulphur, particulate inorganic material and wax at a temperature at which sulphur is molten, and cooling to a temperature at which the sulphur solidifies.

10. A sulphur cement product according to claim 1, wherein the sulphur is elemental sulphur that has been modified by inclusion of sulphur modifier chosen from one or more of naphthalene, 5 ethylidene-2-norbornene, 5 vinyl-2-norbornene, dicyclopentadiene, limonene or styrene, wherein the sulphur modifier is incorporated in an amount from 0.1 to 10 wt % based on the weight of sulphur.

11. A sulphur cement according to claim 10, wherein the wax is a paraffin wax resulting from a Fischer-Tropsch process.

12. A process for preparing a sulphur cement product according to claim 11, comprising steps of mixing the sulphur, particulate inorganic material and wax at a temperature at which sulphur is molten, and cooling to a temperature at which the sulphur solidifies.

13. A process for preparing a sulphur cement product according to claim 10, comprising steps of mixing the sulphur, particulate inorganic material and wax at a temperature at which sulphur is molten, and cooling to a temperature at which the sulphur solidifies.

14. A sulphur cement product according to claim 1, wherein the wax is a paraffin wax resulting from a Fischer-Tropsch process.

15. A process for preparing a sulphur cement product according to claim 4, comprising steps of mixing the sulphur, particulate inorganic material and wax at a temperature at which sulphur is molten, and cooling to a temperature at which the sulphur solidifies.

16. A process for preparing a sulphur cement product according to claim 1, comprising steps of mixing the sulphur, particulate inorganic material and wax at a temperature at which sulphur is molten, and cooling to a temperature at which the sulphur solidifies.

17. A process for preparing a sulphur cement surfacing on a structural material, wherein a sulphur cement product according to claim 1 is applied to the surface of a structural material.

18. A process according to claim 17, wherein the structural material is Portland cement.

\* \* \* \* \*